(12) United States Patent
Flor et al.

(10) Patent No.: US 11,816,588 B2
(45) Date of Patent: *Nov. 14, 2023

(54) FORECASTING DEMAND USING HIERARCHICAL TEMPORAL MEMORY

(71) Applicant: GROUPON, INC., Chicago, IL (US)

(72) Inventors: Patrick George Flor, Evanston, IL (US); Dylan Griffith, Chicago, IL (US); Riva Ashley Vanderveld, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 475 days.

This patent is subject to a terminal disclaimer.

(21) Appl. No.: 16/726,101

(22) Filed: Dec. 23, 2019

(65) Prior Publication Data

US 2020/0210870 A1    Jul. 2, 2020

Related U.S. Application Data (63) Continuation of application No. 14/671,878, filed on Mar. 27, 2015, now Pat. No. 10,558,925.

(60) Provisional application No. 61/972,049, filed on Mar. 28, 2014.

(51) Int. Cl.
 *G06N 5/04* (2023.01)
 *G06N 20/00* (2019.01)
 *G06N 5/047* (2023.01)

(52) U.S. Cl.
 CPC ............ *G06N 5/047* (2013.01); *G06N 20/00* (2019.01)

(58) Field of Classification Search
 None
 See application file for complete search history.

(56) References Cited

U.S. PATENT DOCUMENTS

| | | | | |
|---|---|---|---|---|
| 8,504,570 B2* | 8/2013 | Hawkins | ............... | G06N 20/00 707/752 |
| 9,947,022 B1 | 4/2018 | Shariff et al. | | |
| 2001/0039183 A1 | 11/2001 | Kobayashi et al. | | |
| 2010/0217712 A1 | 8/2010 | Fillmore | | |
| 2014/0365327 A1* | 12/2014 | Crossan | ................. | G06Q 30/08 705/26.4 |
| 2015/0127595 A1* | 5/2015 | Hawkins, II | ........... | G06N 7/005 706/46 |

OTHER PUBLICATIONS

Chaudhari NS, Yuan XM. Demand forecasting of short life span products: Issues, challenges, and use of soft computing techniques. In Handbook of Computational Intelligence in Manufacturing and Production Management 2008 (pp. 124-143). IGI Global. (Year: 2008).*

(Continued)

*Primary Examiner* — Vincent Gonzales
(74) *Attorney, Agent, or Firm* — Alston & Bird LLP (57) ABSTRACT

In general, embodiments of the present invention provide systems, methods and computer readable media to forecast demand by implementing an online demand prediction framework that includes a hierarchical temporal memory network (HTM) configured to learn temporal patterns representing sequences of states of time-series data collected from a set of one or more data sources representing demand and input to the HTM. In some embodiments, the HTM learns the temporal patterns using a Cortical Learning Algorithm.

21 Claims, 8 Drawing Sheets

(56) References Cited

OTHER PUBLICATIONS

Gabrielsson P. König R, Johansson U. Hierarchical Temporal Memory-based algorithmic trading of financial markets. In2012 IEEE Conference on Computational Intelligence for Financial Engineering & Economics (CIFEr) Mar. 29, 2012 (pp. 1-8). IEEE. (Year: 2012).*
Hawkins, "Hierarchical Temporal Memory including HTM Cortical Learning Algorithms", Sep. 12, 2011.
J. Byers et al., "Daily Deals: Prediction, Social Diffusion, and Reputational Ramifications", Web Search and Data Mining '12, Assoc. Comp. Mach., Feb. 2012, pp. 543-552. (Year: 2012).
Price, "Hierarchical Temporal Memory Cortical Learning Algorithm for Pattern Recognition on Multi-core Architectures", 2011.
Rozado, "Optimizing Hierarchical Temporal Memory for Multivariable Time Series", 2010.
U.S. Appl. No. 14/671,878, filed Mar. 27, 2015, U.S. Pat. No. 10,558,925, Issued.

* cited by examiner

FORECASTING DEMAND USING HIERARCHICAL TEMPORAL MEMORY

CROSS-REFERENCE TO RELATED APPLICATIONS

This application is a continuation of U.S. application Ser. No. 14/671,878, titled "FORECASTING DEMAND USING HIERARCHICAL TEMPORAL MEMORY, filed Mar. 27, 2015, which claims the benefit of U.S. Provisional Application No. 61/972,049, titled "FORECASTING DEMAND USING HIERARCHICAL TEMPORAL MEMORY," filed Mar. 28, 2014, the contents of which are incorporated herein by reference in their entirety.

FIELD

Embodiments of the invention relate, generally, to online demand prediction using hierarchical temporal memory.

BACKGROUND

Current methods for forecasting demand exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for online demand prediction using hierarchical temporal memory (HTM).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

The methods, systems, and computer program products described herein are operable to automate a sales pipeline by implementing and/or otherwise executing a demand module, a supply identification module, an assignment module and/or the like. In some examples, the demand module may be configured to determine a forecasted demand for offers (e.g., any type of presented or otherwise indicated reward, discount, coupon, credit, deal, incentive, discount, media or the like that is indicative of an offered value or the like that upon purchase or acceptance results in the issuance of an instrument that may be used toward at least a portion of the purchase of particular goods, services and/or experiences defined by the offer). The forecasted demand provides or otherwise enables a prediction of those offers that a consumer (e.g., a client, customer, purchaser, shopper, user or the like who may be in the position to or does exchange value for one or more offers) will likely purchase if offered, and, as such, enables the prioritization of the sales of the forecasted or demanded offers, which may result in greater interest, revenue, higher margin, offer diversity and/or the like.

As such, and according to some example embodiments, the systems and methods described herein are configured to forecast demand by implementing an online demand prediction framework (ODPF) that includes a hierarchical temporal memory network (HTM) configured to learn temporal patterns representing sequences of states of time-series data collected from a set of one or more data sources representing demand and input to the HTM. In embodiments, exemplary data sources may include bookings, retail sales, user click-stream data, and/or exogenous data (e.g., live Twitter interest in data categories and/or services). In some embodiments, the HTM learns the temporal patterns using a Cortical Learning Algorithm (CLA).

An HTM is capable of online learning, i.e., learning by continually modifying its stored sequences of patterns based on each new input it receives. Generating an HTM model via online learning can be implemented by exposure of the HTM to sequences of inputs that include historical datastreams, live datastreams, or a combination; online learning does not require a distinct training phase such as supervised learning does, and thus enables the avoidance of the often significant costs associated with machine learning, e.g., assembling a supervised learning training data set that is representative of a solution to a particular problem to be solved. An HTM model becomes more efficient at learning as it is exposed to more input data. It is able to adapt in place if the input data change and thus is more resistant to noisy input data than a neural network trained using supervised learning.

In embodiments, the HTM represents a demand model which is the basis for generating predictions of future states of the input data from the set of data sources. The ODPF output is at least one record that includes predictions generated by the HTM demand model. In some embodiments, the ODPF output includes at least one metric respectively associated with each the generated predictions. In some embodiments, the metric may be an error score representing the quality of the prediction, an anomaly score representing a comparison between the prediction and its most likely expected value, and/or a combination.

In embodiments, the HTM demand model generates simultaneous predictions of demand at multiple different points of future time. An exemplary model output that includes these multi-step predictions may be the predicted number of bookings at one day, one week, and one month in the future. In some embodiments in which the HTM demand model output includes sets of predictions about multiple types of data collected from different data sources, each set of predictions may be shifted forward in time at different time intervals.

In some embodiments, demand forecasting may be based in part on the demand predictions in an ODPF output. For example, in embodiments, forecasting demand may be based on predicting sales month by month for the next year provided there are sufficient units available; extrapolating, using the predicted sales, a total of units that will be sold in the next year; and predicting total sales revenue for the next year based on the total of units that will be sold.

Figure 1:
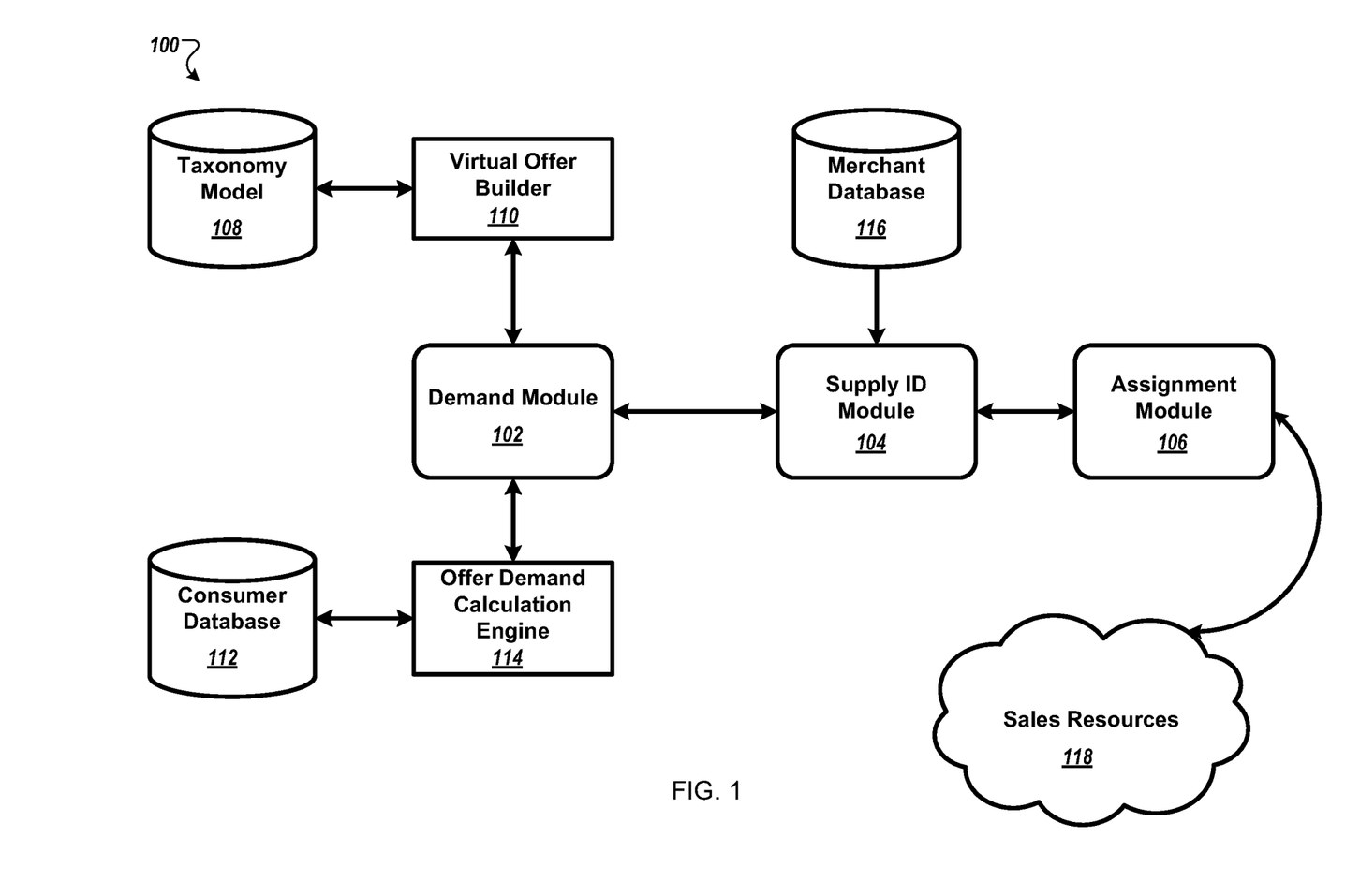
FIG. 1 illustrates an example system that can be configured to implement an exemplary process for sales pipeline automation in accordance with some embodiments discussed herein.

FIG. 1 illustrates an example system 100 that can be configured to implement an exemplary process 100 for sales pipeline automation. The process is described in detail in U.S. patent application Ser. No. 13/826,333, filed Mar. 12, 2013, titled "METHOD, APPARATUS, AND COMPUTER PROGRAM PRODUCT FOR FORECASTING DEMAND," and which is incorporated herein in its entirety.

In general, the process 100 may forecast or otherwise determine a demand via the demand module 102. The demand illustrates and/or otherwise identifies the offers a consumer is willing to purchase in a local area (e.g., category and/or sub category of a good, service or experience, a price, a location, a time and/or the like). In some examples, the forecasted demand may be indicative of demanded offers in the local area, however in other examples the demand may be indicative of a demanded good, service or experience in the local area irrespective of an offer.

In order to facilitate the forecasted demand, the demand module 102 is configured to generate one or more virtual offers, such as via the taxonomy model 108 and/or the virtual offer builder 110. Virtual offers are representative of one or more offers that could be offered in a local area. For example, $25 massages or $10 for $20 at a local clothing store. Additional description relating to the building the one or more offers is further described at least with respect to the virtual offer generation module 202 in FIG. 2.

The virtual offers may then be analyzed to determine the probabilities that a particular consumer, such as a current or past subscriber, would purchase the particular virtual offer, such as via the demand calculation engine 114. The demand calculation engine 114 may be configured to generate or otherwise determine the probabilities based on for example past purchase history in a consumer database 112, historic demand for similar offers, search engine results, survey results, current market trends and/or the like. Using the probabilities (e.g., the probability that each of a plurality of consumers would buy each of a plurality of virtual offers), a forecasted demand may be generated. Additional description relating to determining the probability that a particular customer would purchase a particular offer is further described at least with respect to the probability generation module 204 in FIG. 2.

In some example embodiments, the demand module 102 may adjust the forecasted demand based on factors, such as, but not limited to seasonality, economic conditions, holidays, weather and/or the like. Additional description relating to demand adjustment is further described at least with respect to the demand adjustment module 206 in FIG. 2. The demand module 102 is configured to output a forecasted demand to the supply ID module 104.

Figure 2:
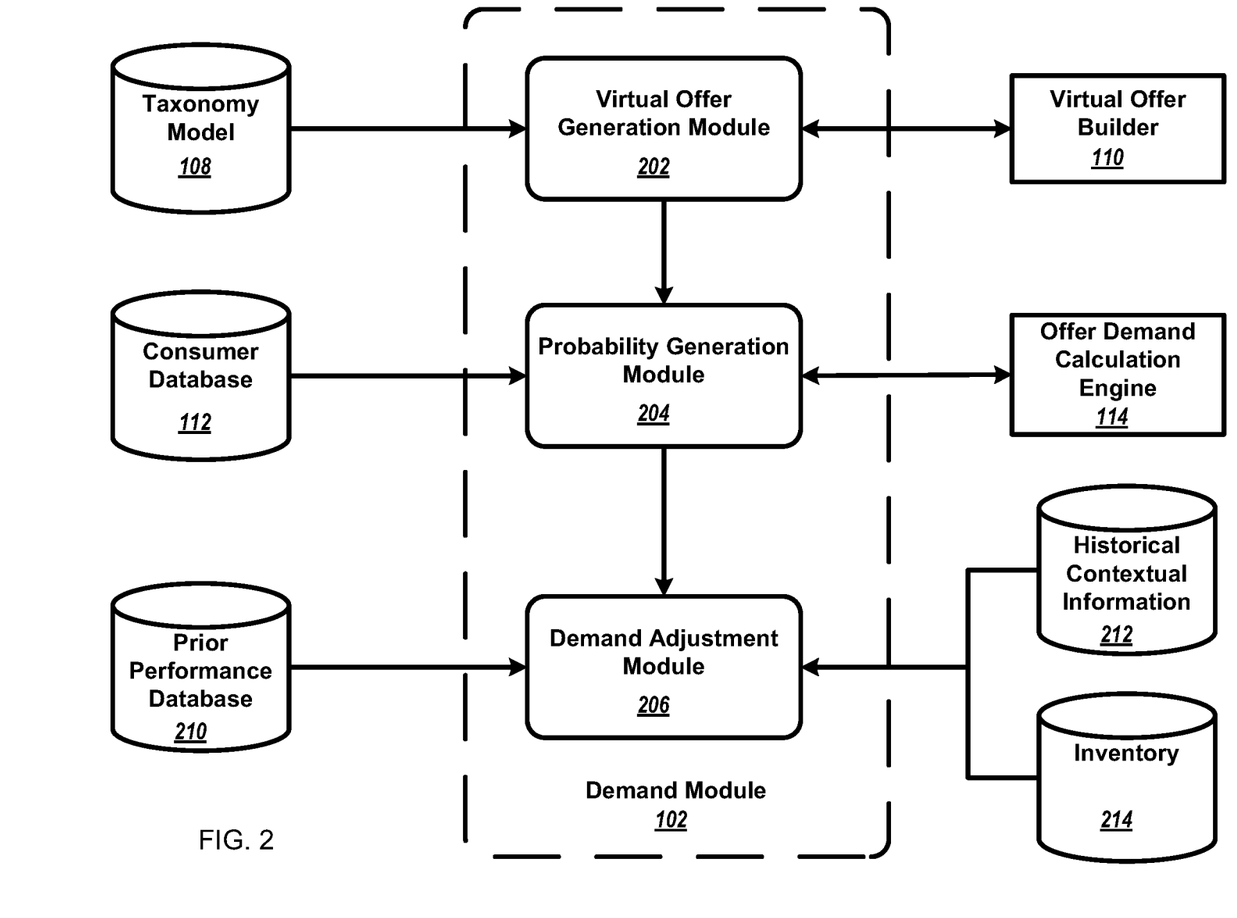
FIG. 2 shows a schematic block diagram of circuitry that can be included in a computing device in accordance with a demand module in accordance with some embodiments discussed herein.

FIG. 2 shows a schematic block diagram of circuitry that can be included in a computing device in accordance with demand module 102 shown, for example, in process 100. Demand module 102 may include virtual offer generation module 202, a probability generation module 204, a demand adjustment module 206 and/or the like to generate a forecasted demand or one or more virtual offers. Each block of the circuit diagrams, and combinations of blocks in the circuit diagrams, may be implemented by special purpose hardware-based computer systems that perform the specified functions or steps, or combinations of special purpose hardware and computer instructions.

The virtual offer generation module 202 may utilize input from or otherwise embody a taxonomy model 108 and/or a virtual offer builder 110 to generate a virtual offer. In some example embodiments, the taxonomy model 108 defines a hierarchical structure of service categories and sub-categories that may be found in one or more local or hyper-local areas. For example, the taxonomy model 108 may define "food and dining" as a category and "Italian" as a sub-category. Alternatively or additionally, the taxonomy model 108 may define a hierarchical structure that is based on location, sub-locations, and/or hyper-local regions, such as any of country, state, county, city, zip code, neighborhood, or street. For example, a location may be "Chicago" and a hyper-local region may be "north side". Alternatively or additionally, the taxonomy model 108 may define a hierarchical structure that is based on target consumer categories such as "family fun" or "high octane adventures." One or more of the sub-categories may then be specific to the target consumer category, for example, "children under 5" or "high speed" respectively. Additional sub-categories may be general, such as "dining" or "in your neighborhood". In another embodiment, the taxonomy model 108 may define a hierarchical structure that is based on service. For example, "wine/food" or "Swedish massage". Virtual offer builder 110 may generate a virtual offer based on such hierarchical structure, such that a virtual offer may comprise a service, a category and sub-category. For example, "wine/food", "food and dining" and "Italian" may be service, category and sub-category of a virtual offer.

In some example embodiments, the virtual offer builder 110 may be configured to construct one or more virtual offers. In some examples, every combination of virtual offers that may be constructed, as defined by a taxonomy model, is constructed. Alternatively or additionally, the virtual offer generation module 202 may be configured to generate virtual offers according to a set of guidelines or rules. The guideline may be operable to provide limitations on prices or price ranges that one or more sub-sets of categories and/or sub-categories may be paired within a virtual offer. For example, the virtual offer generation module 202 may be configured to limit the generation of a first category and/or first sub-category to a first sub-set of price ranges. For example, a virtual offer comprising a category of "food and dining" and a sub-category of "pizza" may be limited to prices and/or price ranges under a predetermined limit, e.g., $100. Whereas a virtual offer comprising a category of "food and dining" and a sub-category of "fine dining" may be limited to prices and/or price ranges over a predetermined limit, e.g., $50.

In another example embodiment, the limitations on the generation of virtual offers may be made according to prior performance of the virtual offers at each of one or more prices or price ranges, prior performance of certain categories and/or the like. Alternatively or additionally, the virtual offer generation module 202 may limit virtual offer generation to a specific time period (e.g., "spring", "February", "next 60 days"), a specific location and/or hyper-local region (e.g., "Chicago" and/or "60602"). In further examples, the virtual offers may be limited to categories and/or sub categories having merchants in a given area.

In some example embodiments, the virtual offer generation module 202 may provide one or more generated virtual offers to the probability generation module 204. The probability generation module 204 may be configured to determine a probability that a particular consumer may purchase a particular virtual offer. The probability generation module 204 may be configured to access consumer data in a consumer database 112. The consumer database 112 may comprise one or more users and user data related to each of the one or more users that may be used to calculate a probability that a particular user would buy a particular offer in a particular time frame for at least a portion of the plurality of users and for each of the virtual offers. In one example embodiment, the probability generation module 204 may determine a probability that a first consumer, second customer, an $n^{th}$ customer would buy a first virtual offer.

In some example embodiments, the probability generation module 204 may further be configured to generate a ranked user list for each of the one or more users comprising each of the one or more virtual offers and an associated calculated probability. In some examples, the probability generation module 204 may be operable to cast a vote for a particular offer. For example, a vote may be cast for the top t offers in the ranked list. Alternatively or additionally, the vote value may be assigned based on the area in the ranked list and/or the like.

In some examples, a union of the top t offers for each user, the top x offers based on votes or the like may be used to select demanded offers from the set of virtual offers. Given a specific list of demanded offers, each of the demanded offers may be matched with a forecasted demand (e.g., in terms of quantity of units, revenue or the like) by aggregating the probabilities that each of the users would purchase the offer as output by the demand calculation engine 114. Alternatively or additionally, the output may be ranked, prioritized, diversified, and/or trimmed. In some example embodiments, a projected revenue value may be calculated for each virtual offer based on prior performance data per unit and an estimated number of units to be sold. Based on the revenue calculation, the one or more virtual offers by the projected revenue.

The demand adjustment module 206 may be configured to input the list of demanded offers and provide one or more adjustments based on diversity, portfolio mix, price mix, hyper-local constraints, prior performance, context information or the like using a prior performance database 210, historical contextual information 212, and inventory 214. In some example embodiments, the demand adjustment module 206 may apply a diversity adjustment. The diversity adjustment may comprise user-level diversity adjustment (e.g., individual consumer probabilities are adjusted based on predetermined constraints, such as user may have a 40% "food and dining" maximum), aggregated output level (e.g., forecasted demand is adjusted to predetermined constraints, such as a maximum of 40% food and dining, 30% health and beauty and/or the like) and/or the like. Alternatively or additionally, the adjustment may take into account a category mix, such as by selecting a certain percentage of offers based on the ranked list according to a set percentage, a price mix or the like.

In some example embodiments, the demand adjustment module 206 may be configured to adjust the forecasted demand according to prior performance. For example, specific offers may have outperformed or underperformed calculated demand of a related virtual offer in a past offering, indicating that the demand for the related virtual offer may be more accurately represented by a higher or lower demand. In such cases, the demand adjustment module 206 may adjust the forecasted demand based on the historic data.

In some example embodiments, the demand adjustment module 206 may be configured to adjust a demand of one or more virtual offers according to context information, such as seasonality, discrete weather events, economic conditions and/or other recurring events. For example, demand for one or more categories or sub-categories may be adjusted according to seasonality or a specific season (e.g., adjust "ski" virtual offers upward in late fall or winter and adjust down in spring), rainfall (e.g., adjust "outdoor virtual offers during above average rainfall periods) and/or the like. In some example embodiments, specific events may cause adjustment (e.g., adjust "golf" virtual offers during time periods when golf events are happening, such as the U.S. Open and/or in locations or hyper-local regions where golf events are taking place, such as Rochester, N.Y. during the PGA championship 2013.).

The demand adjustment module 206 may therefore be configured to output one or more virtual offers, each with a corresponding demand. The corresponding demand may include demand amounts that may have been adjusted based on any one or more of the aforementioned factors. The corresponding demand may also include demand amounts that have not adjusted by any of the aforementioned factors. As such, the collective demand information output by probability generation module 204 is referred to as forecasted demand herein.

Alternatively or additionally, demand may be forecasted using historical conversion rates for each potential virtual offer and each known consumer, top categories or sub categories rank ordered by performance metrics such as Engaged User Profit Per Thousand (ePPM) or the like, search engine data, use of a website that provides the one or more offers, subscription data, historical sales, sales in the market place and/or the like. In some examples, offer related keywords on search engines click through to an offer can be leveraged as a signal of demand (e.g., a model that translates or otherwise correlates searches to offers sold). In some examples, the use of a website or mobile application that displays or otherwise advertises available offers may be tracked as an exogenous source of demand and can be used in identifying not only the current demand, but also for identifying high demand offers that are not currently stocked. Each of these demand forecasting methods may be used in conjunction with each of the other demand forecasting methods as well as may be used alone.

In some alternative embodiments, the probability generation module 204 may be implemented as an online demand prediction framework (ODPF, hereinafter) that includes a hierarchical temporal memory network (HTM, hereinafter) which is configured to learn temporal patterns representing sequences of states of at least one datastream representing a time series of data collected from a set of one or more data sources representing demand. In some embodiments, for example, the set of data sources may include one or more of bookings, retail sales, and/or user clickstream data representing deal page clicks. In some embodiments, the HTM network is configured to learn temporal patterns using a cortical learning algorithm (CLA) as described, for example, in "Hierarchical Temporal Memory including HTM Cortical Learning Algorithms, version 0.2.1, Sep. 12, 2011" a white paper published online by Numenta, Inc. at http://numenta.org/cla-white-paper.html.

Figure 3:
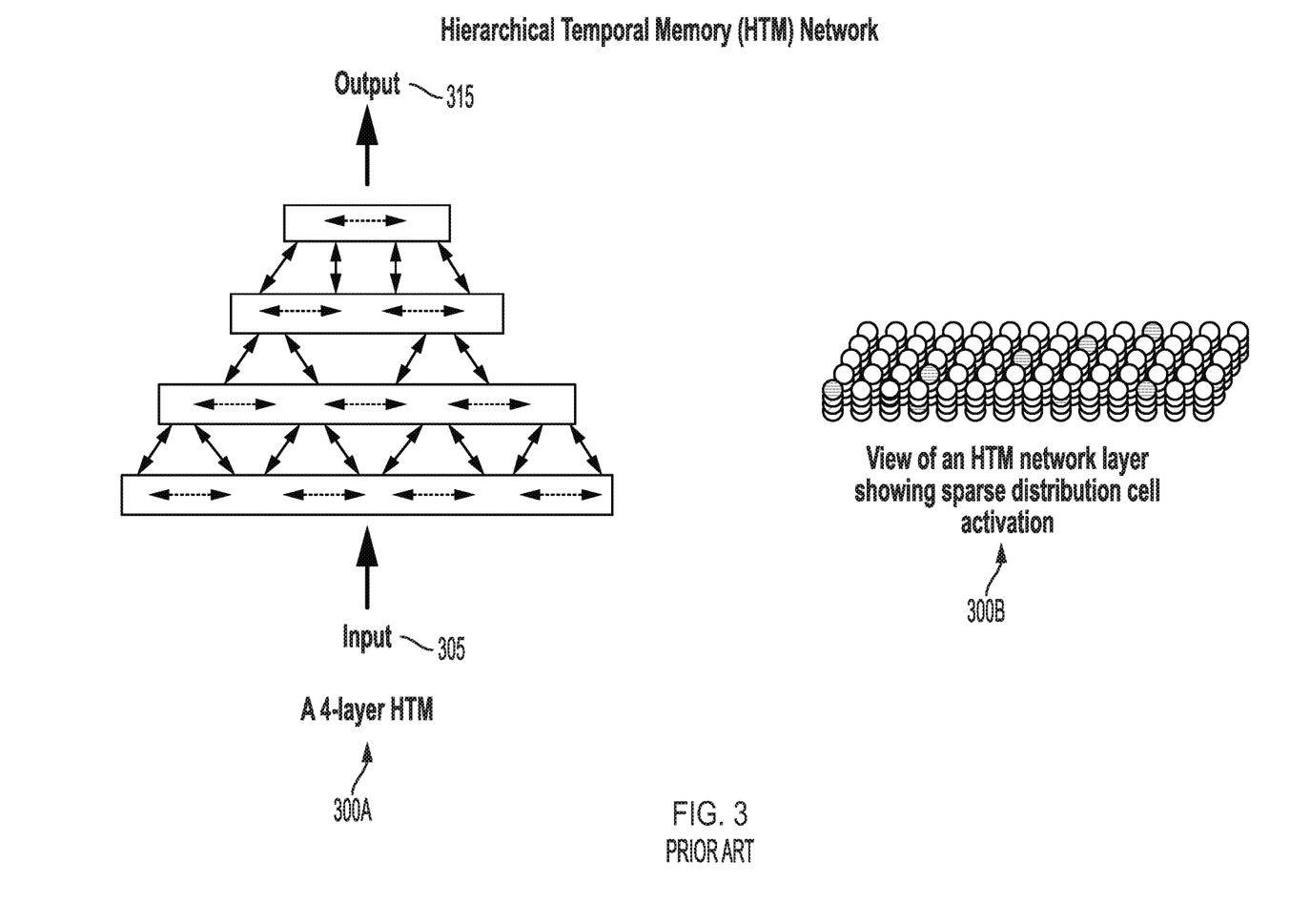
FIG. 3 is an illustration of an exemplary prior art 4-layer HTM and a view of an exemplary prior art HTM layer in accordance with some embodiments discussed herein.

FIG. 3 is an illustration of an exemplary prior art 4-layer HTM 300A and a view of an exemplary prior art HTM layer 300B. Exemplary HTM 300A and exemplary HTM layer 300B are for illustration only and are not representative embodiments of the invention.

An HTM is considered to be a type of neural network, because its structure models the structure of the brain neocortex. Each layer of an HTM is considered to represent one layer of neurons in a neocortical region, and is a structure composed of interconnected columns of nodes (cells hereinafter). Exemplary layer 300B is a 5 by 14 two-dimensional array of 4-cell columns. The choice of the number of cells per column, the organization of the columns, and the number of columns within each HTM layer is fully configurable and may be based in part on the HTM information storage requirements.

The input to a layer is a set of bits that each may be active (value 1) or inactive (value 0); the set of bits thus represents a binary encoding of the input. Each column in a layer is connected to a unique subset of the input bits, and the cells within each column may become active or inactive in response to a sum of the values of input bits respectively received by the column. The columns within a layer are interconnected, and the columns with the strongest activation (i.e., the columns containing the highest number of active cells) in response to input can inhibit, or deactivate, the cells in columns with weaker activation. Thus, a layer's response to input can create an encoding of activation (an activation pattern, hereinafter) across the cells in the layer. An activation pattern may be stored within a layer according to a sparse (only a few cells in the layer are active) distributed (the cell activity is interpreted within the context of all the cells in the layer) pattern, as illustrated by the pattern of shaded cells in exemplary layer 300B. The HTM layer thus can remember receiving a previous instance of a new input if it can match the activation pattern produced by the new input with an activation pattern it has stored.

The layers of an HTM (e.g., the 4 layers in exemplary HTM 300A) are arranged in a hierarchy, with each layer having interconnections to its parent layer in the hierarchy. The initial input data bits 305 are received by the bottom layer in the hierarchy, and the cell activation patterns generated in the lower layer become the inputs to its parent layer. Thus, the higher an HTM layer is in the hierarchy, the more abstract and interpreted are the patterns it receives and stores. The storing and processing of visual input by the brain is a biological analogy to the storing and processing of information in layers of an HTM. The neurons in the lower layers of the visual system (e.g., neurons in the thalamus of the brain) receive (via the optic nerve) and interpret the initial sensory input coming from the eye (e.g., patterns of activation of receptors from the retina), while the neurons in the higher layers of the brain (e.g., neurons in the visual cortex that interpret images) receive patterns of activation from the neurons in the lower layers of the brain.

An HTM "learns" by being exposed to many time-changing sequences of inputs from a common source, and then storing the sequences of patterns as a model of which patterns follow which other patterns. This model can be used as the basis for inference, i.e., to recognize input patterns and then to make predictions, based on the stored sequence of inputs to which the recognized input as well as immediately past inputs most likely belong, about which other patterns are most likely to follow the recognized input. Each layer stores its respective model of the sequencing of input patterns it receives. The output 315 of an HTM is the set of predictions made by the layer at the top level of the hierarchy. Referring to the visual system analogy, the output of visual processing by the brain is an interpretation of images perceived by the visual cortex.

A typical neural network (e.g., a multi-layer feed-forward network) is generated during a supervised learning training phase (e.g., back propagation), a conventional machine learning methodology in which the weight coefficients associated with the network nodes and edges are adapted based on exposure to a training data set of exemplary inputs and their known associated outputs. An HTM, in contrast, is capable of online learning, i.e., learning by continually modifying its stored sequences of patterns based on each new input it receives. Generating an HTM model via online learning can be implemented by exposure of the HTM to sequences of inputs that include historical datastreams, live datastreams, or a combination; online learning does not require a distinct training phase such as supervised learning and thus enables the avoidance of the often significant costs associated with machine learning, e.g., assembling a supervised learning training data set that is representative of a solution to a particular problem to be solved.

An HTM model becomes more efficient at learning as it is exposed to more input data. It is able to adapt in place if the input data change and thus is more resistant to noisy input data than a neural network trained using supervised learning. Since each HTM layer learns a respective model of its input, it is possible to freeze online learning for some or all of the HTM layers to match characteristics of the input data (e.g., freeze online learning for the lower layers in cases where the initial input is constant while allowing the upper layers to continue to adapt to new sequences of input received from the lower layers).

Figure 4:
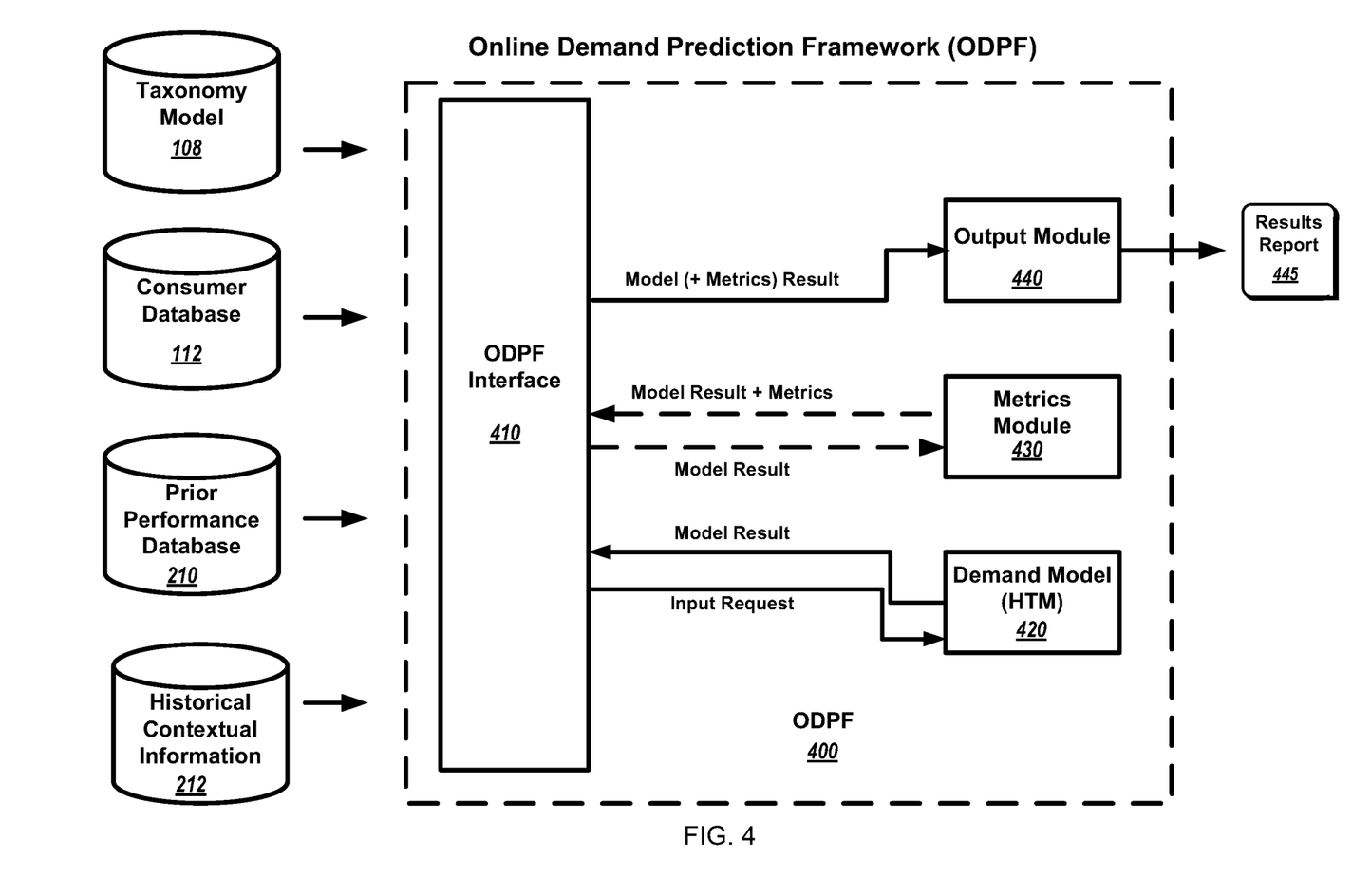
FIG. 4 is an illustration of an exemplary online demand prediction framework (ODPF) that is configured to generate demand forecasting in accordance with some embodiments discussed herein.

FIG. 4 is an illustration of an exemplary online demand prediction framework (ODPF) 400 that is configured to generate demand forecasting according to various embodiments of the invention. In some embodiments, ODPF 400 may be configured to implement probability generation module 204 within sales pipeline automation system 100 by leveraging an HTM demand model to make predictions about input data representing demand. In embodiments, ODPF 400 may comprise an ODPF interface 410 for receiving input data and generating and/or dispatching input requests to modules within the ODPF 400; an HTM demand model 420 for receiving input requests comprising at least one time series datastream from at least one data source (e.g., taxonomy model 108, consumer database 112, prior performance database 210, and/or historical contextual information 212), recognizing patterns within the input data, and generating a demand model result comprising at least one inference based on the recognized patterns; a metrics module 430 for optionally generating representations of the quality of the inferences generated by the HTM model 420; and an output module 440 for generating at least one report 445 of the model predictions and/or the metrics results.

In embodiments, ODPF interface 410 includes a data input client that receives time series data representing demand from one or more data sources. In some embodiments, demand may represent demand for promotions (deals, hereinafter) that are offered or are to be offered by a promotion and marketing service, and the data sources may include attributes of deals, orders, retail sales, and/or user clickstream data that represents deal page clicks made by users. In some embodiments, the data sources include one or a combination of historical data (e.g., warehoused data) and/or live data that are currently being collected by the promotion and marketing service.

In some embodiments, the received time series data representing demand may be pre-processed further before it is input to an HTM demand model 420. For example, in some embodiments, further pre-processing of time series data may include slicing a time series of monthly sales data collected over a previous period of time (e.g., the past 6 months) according to one or more of the following attributes: deal category, service, subdivision, and/or price bin. In some embodiments, further pre-processing may include creating tuples of interest from combinations of the additionally sliced data. In some embodiments, tuples of interest may be included as input to an HTM demand model 420 to discover one or more particular combinations of data attributes that may be the most significant predictors of demand. In some embodiments, pre-processing of the input data may be implemented in the ODPF interface 410 while, in alternative embodiments, data pre-processing may be implemented external to the ODPF 400. In some embodiments, the input time series data received by the ODPF interface 410 may include a combination of pre-processed data (e.g., monthly sales data pre-processed into tuples of interest) and time-series data that has not been pre-processed (e.g., monthly retail sales and/or monthly clickstream data).

In some embodiments, ODPF interface 410 generates an HTM model input request based on received input data that may further include request configuration data. In embodiments, request configuration data may specify generating the HTM model input request and/or specify the model results to be returned in a report of the model predictions based on the time series data being input to the model. Examples of request configuration data may include specification of enabling/disabling model inferencing, specification of the number and type of predictions to be generated by the model, enabling/disabling of additional learning (i.e., whether learning should be frozen in some or all of the model layers, as described with reference to FIG. 3), and/or enabling/disabling the calculation of metrics for the model predictions.

Figure 5:
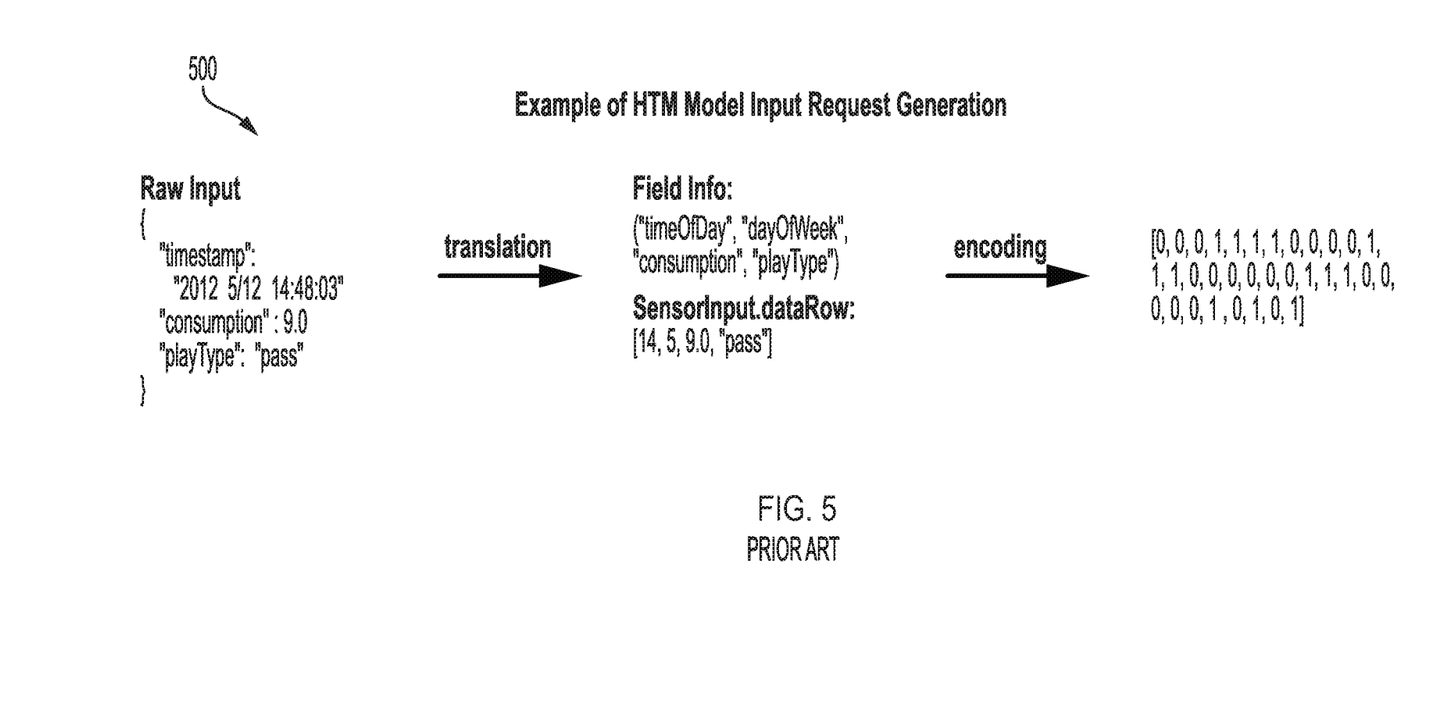
FIG. 5 illustrates a prior art example of generating an HTM model input request in accordance with some embodiments discussed herein.

FIG. 5 illustrates a prior art example 500 of generating an HTM model input request. In some embodiments, generating an HTM demand model request may be implemented by ODPF interface 410. The data in example 500 are included for illustration purposes only, and are not representative of embodiments of the invention.

In embodiments, received raw input data may be represented as a dictionary object containing key/value pairs. In some embodiments, generating an HTM demand model input request may further comprise translating some or all of the received raw input data into an intermediate representation (e.g., generating a scalar representation, quantizing data values by assigning them to one of a set of bins). Referring to exemplary translation 500, the raw input timestamp has been translated into the time of day and the day of the week, while the raw data for consumption and play type have not been translated. In some embodiments, the extent of and type of data translation implemented during generation of an HTM model input request may be specified in the input data received by ODPF interface 410.

In some embodiments, generating an HTM demand model input request may further comprise encoding the raw input data and/or translated input data into a binary representation for input to the HTM demand model 420. In some embodiments, the encoding of data implemented during generation of an HTM model input request may be specified in the input data received by ODPF interface 410.

In some embodiments, the ODPF 400 may be initialized by implementing an initial learning phase during which an instantiated HTM demand model 420 converges in response to receiving time series data representing demand. For example, in embodiments, an initial learning phase may include adapting the instantiated HTM by implementing a Cortical Learning Algorithm (CLA). For example, in embodiments, an ODPF 400 initial learning phase may include instantiating an N-layer HTM and using a CLA to adapt the instantiated HTM in response to receiving an input datastream of warehoused data representing daily gross revenue from past bookings and past clickstream data. In some embodiments, the input datastream may be input repeatedly to the HTM, since, as previously described with reference to FIG. 3, learning efficiency of an HTM improves with experience. In some embodiments, the HTM demand model 420 is determined to converge when a pattern of daily fluctuations is predicted with xx % accuracy. In some embodiments, calculating metrics representing the accuracy of predictions is implemented by metrics module 430. In some alternative embodiments, the ODPF 400 does not implement an initial learning phase and, instead, may be initialized by including an HTM demand model 420 that has converged already.

In some embodiments, an initial learning phase of an ODPF 400 enables discovery of data attributes and/or combinations of data attributes that were important predictors of demand. For example, in some embodiments, the relative importance of each of a set of tuples of interest for forecasting demand may be determined by implementing an initial learning phase using input data representative of the tuples of interest and selecting the subset of tuples for which the HTM achieved optimal convergence.

Figure 6:
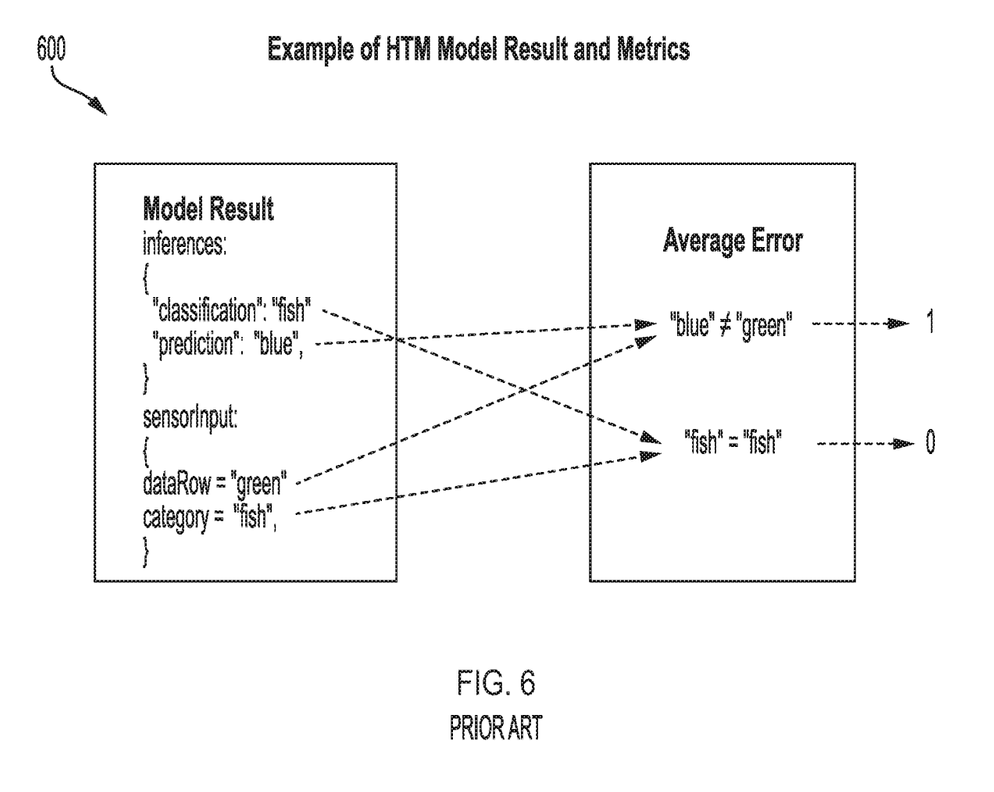
FIG. 6 illustrates a prior art example of an HTM model result and its associated metrics in accordance with some embodiments discussed herein.

FIG. 6 illustrates a prior art example 600 of an HTM model result and its associated metrics. The data in example 600 are included for illustration purposes only, and are not representative of embodiments of the invention.

As previously described with reference to FIG. 3, an HTM model can be used as the basis for inference, i.e., to recognize input patterns and then to make predictions about which other patterns are most likely to follow the recognized input in a time sequence. In embodiments, an HTM demand model may be used to receive an input request that includes multiple types of data, and, in response, generate a separate prediction about each of the data types at one or more different points of time in the future. For example, in embodiments, an HTM demand model may receive input data representing bookings and user clickstream data, and generate a result that includes separate predictions about the number of bookings and the number of user clicks from a deal page. In a second example, in response to receiving the bookings and clickstream input data, an HTM demand model result may include daily bookings predictions and monthly clickstream predictions.

In some embodiments, metrics may be calculated to evaluate the quality of each of the predictions included in an HTM model result. In some embodiments, calculating metrics representing is implemented by metrics module 430. In some embodiments, the metrics associated with a prediction may include an error measurement, representing a comparison of the prediction with a ground truth value, and/or an anomaly score, representing a comparison between each prediction and its most likely expected value.

Referring to prior art example 600, the exemplary model result includes two predictions based on received input data: the color of an animal and the categorization of the animal. The exemplary metric is an average error for each prediction based on comparing each prediction with its respective ground truth value.

Figure 7:
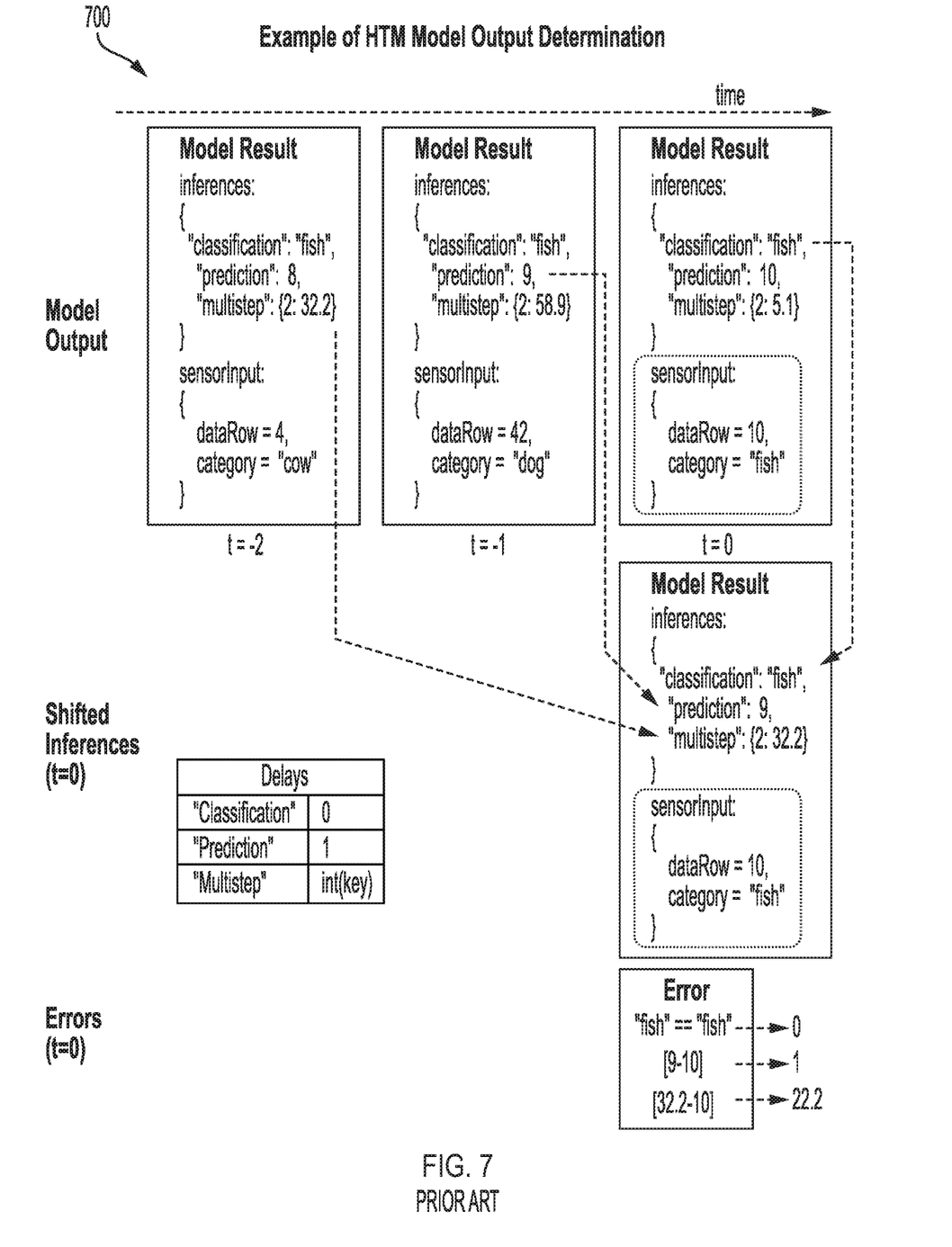
FIG. 7 illustrates a prior art example of an HTM model output determination in accordance with some embodiments discussed herein.

FIG. 7 illustrates a prior art example 700 of an HTM model output determination. The data in example 700 are included for illustration purposes only, and are not representative of embodiments of the invention.

In embodiments, an HTM demand model may be used to make simultaneous predictions of demand at multiple different points of future time. An exemplary model output that includes these multi-step predictions may be the predicted number of bookings at one day, one week, and one month in the future. In some embodiments in which the HTM demand model output includes sets of predictions about multiple types of data, each set of predictions may be shifted forward in time at different time intervals. In some embodiments, specification of multi-step time intervals for predictions about at least one type of input data may be included in input received by ODPF interface 410.

Referring to prior art example 700, the model result at t=0 is generated (see the arrows) by shifting forward predictions made at two previous time steps. The metrics (average error) for each type of data are calculated by comparing the shifted predictions to the respective ground truth value for each type of data (e.g., category="fish" and dataRow=10).

Figure 8:
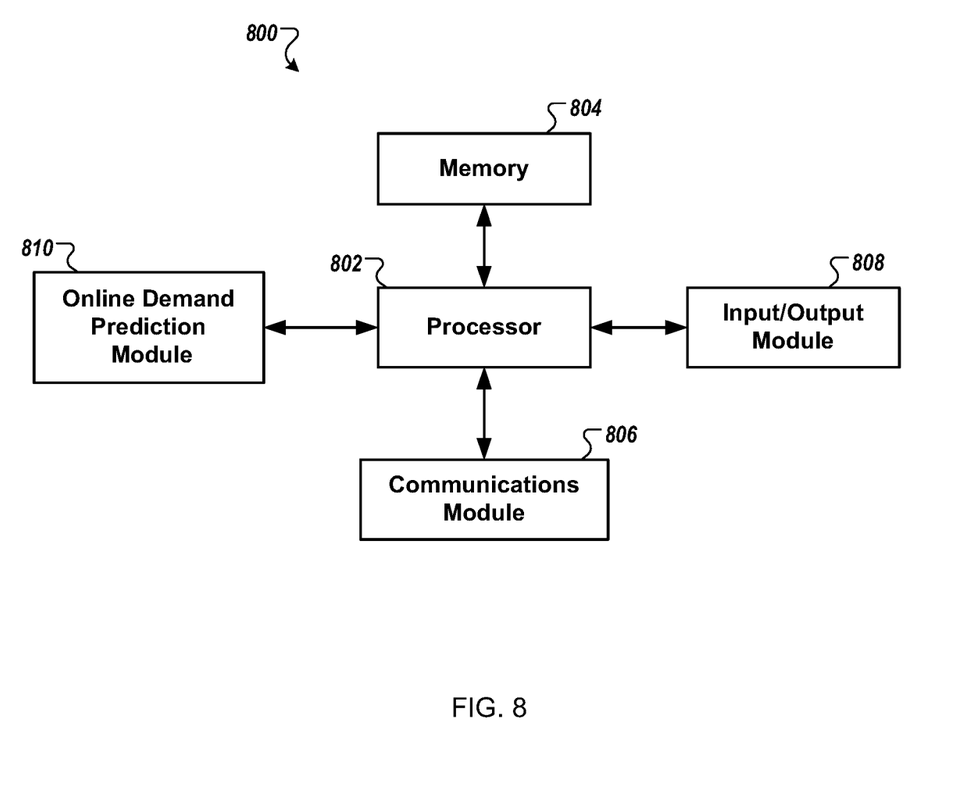
FIG. 8 illustrates a schematic block diagram of circuitry that can be included in a computing device, such as an online demand prediction system, in accordance with some embodiments discussed herein.

FIG. 8 shows a schematic block diagram of circuitry 800, some or all of which may be included in, for example, sales pipeline automation system 100. As illustrated in FIG. 8, in accordance with some example embodiments, circuitry 800 can include various means, such as processor 802, memory 804, communications module 806, and/or input/output module 808. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as a single processor, in some embodiments processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIG. 4.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including analytics data), applications, instructions, or the like for enabling circuitry 800 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with FIG. 4. As such, input/output module 808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 800 is implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800. Input/output module 808 may be in communication with the memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

Online demand prediction module 810 may also or instead be included and configured to perform the functionality discussed herein related to the online demand prediction framework discussed above. In some embodiments, some or all of the functionality of online demand prediction may be performed by processor 802. In this regard, the example processes and algorithms discussed herein can be performed by at least one processor 802 and/or online demand prediction module 810. For example, non-transitory computer readable media can be configured to store firmware, one or more application programs, and/or other software, which include instructions and other computer-readable program code portions that can be executed to control each processor (e.g., processor 802 and/or online demand prediction module 810) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or online demand prediction module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising one or more computers and one or more storage devices storing instructions that are operable, when executed by the one or more computers, to cause the one or more computers to:
retrieve a demand model configured to learn temporal patterns representing sequences of states of an input data stream representing a time series of demand data associated with offers for goods, services, or experiences purchased via one or more electronic instruments;
simultaneously generate, using the demand model, a plurality of predictions of future states of the input data stream, wherein each prediction of the plurality of predictions is associated with a different unique data type and a particular time step in a future time sequence, wherein the demand model comprises a plurality of layers arranged in a hierarchy, wherein each layer in the hierarchy is configured based on a respectively distinct sequence of patterns for processing at least one or more clickstream data portions of the input data stream, and wherein the one or more clickstream data portions represent one or more user interactions with respect to the one or more electronic instruments; and
adjust a forecasted demand associated with the goods, services, or experiences based at least on the plurality of predictions of the future states of the input data stream.

2. The system of claim 1, wherein the one or more storage devices store instructions that are operable, when executed by the one or more computers, to further cause the one or more computers to:
transmit the forecasted demand to a supply identification module associated with a merchant database.

3. The system of claim 1, wherein the time series of demand data is a first time series of demand data, and wherein the one or more storage devices store instructions that are operable, when executed by the one or more computers, to further cause the one or more computers to:
receive a new input data stream representing second time series of demand data configured based on a combination of attributes; and
generate, using the demand model, a second set of predictions of future states of the new input data stream.

4. The system of claim 1, wherein each layer in the hierarchy comprises an interconnection to a parent layer in the hierarchy.

5. The system of claim 4, wherein a bottom layer of the hierarchy receives the input data stream, wherein the bottom layer generates patterns based on the input data stream, and wherein the patterns are provided as inputs to the parent layer.

6. The system of claim 1, wherein respective layers of the plurality of layers arranged in the hierarchy store a respective model of the respectively distinct sequence of temporal patterns.

7. The system of claim 1, wherein the demand model is configured to learn the temporal patterns using a cortical learning algorithm.

8. The system of claim 1, wherein the demand model is configured to modify at least one temporal pattern from the temporal patterns.

9. The system of claim 1, wherein the demand model is configured to store at least one new temporal pattern from the temporal patterns.

10. The system of claim 1, wherein each prediction of the plurality of predictions is associated with an error score.

11. The system of claim 1, wherein each prediction of the plurality of predictions is associated with an anomaly score.

12. The system of claim 1, wherein the one or more storage devices store instructions that are operable, when executed by the one or more computers, to further cause the one or more computers to:
adjust formatting of one or more portions of the input data stream provided to the plurality of layers of the demand model based at least on one or more attributes related to the goods, services, or experiences.

13. A computer-implemented method, comprising:
retrieving a demand model configured to learn temporal patterns representing sequences of states of an input data stream representing a time series of demand data associated with offers for goods, services, or experiences purchased via one or more electronic instruments;
simultaneously generating, using the demand model, a plurality of predictions of future states of the input data stream, wherein each prediction of the plurality of predictions is associated with a different unique data type and a particular time step in a future time sequence, wherein the demand model comprises a plurality of layers arranged in a hierarchy, wherein each layer in the hierarchy is configured based on a respectively distinct sequence of patterns for processing at least one or more clickstream data portions of the input data stream, and wherein the one or more clickstream data portions represent one or more user interactions with respect to the one or more electronic instruments; and
adjusting a forecasted demand associated with the goods, services, or experiences based at least on the plurality of predictions of the future states of the input data stream.

14. The computer-implemented method of claim 13, further comprising:
collecting the time series of demand data from a set of data sources comprising a plurality of unique data types.

15. The computer-implemented method of claim 13, wherein the time series of demand data is a first time series of demand data, and further comprising:
receiving a new input data stream representing second time series of demand data configured based on a combination of attributes; and
generating, using the demand model, a second set of predictions of future states of the new input data stream.

16. The computer-implemented method of claim 13, further comprising:
receiving the input data stream via a bottom layer of the plurality of layers arranged in the hierarchy associated with the demand model;
generating, via the bottom layer, patterns based on the input data stream; and
providing the patterns as inputs to a parent layer of the plurality of layers.

17. The computer-implemented method of claim 13, further comprising:
storing a respective model of the respectively distinct sequence of temporal patterns.

18. A computer program product, stored on a non-transitory computer readable medium, comprising instructions that when executed by one or more computers cause the one or more computers to:

retrieve a demand model configured to learn temporal patterns representing sequences of states of an input data stream representing a time series of demand data associated with offers for goods, services, or experiences purchased via one or more electronic instruments;

simultaneously generate, using the demand model, a plurality of predictions of future states of the input data stream, wherein each prediction of the plurality of predictions is associated with a different unique data type and a particular time step in a future time sequence, wherein the demand model comprises a plurality of layers arranged in a hierarchy, wherein each layer in the hierarchy is configured based on a respectively distinct sequence of patterns for processing at least one or more clickstream data portions of the input data stream, and wherein the one or more clickstream data portions represent one or more user interactions with respect to the one or more electronic instruments; and adjust a forecasted demand associated with the goods, services, or experiences based at least on the plurality of predictions of the future states of the input data stream.

19. The computer program product of claim 18, wherein the instructions, when executed by the one or more computers, further cause the one or more computers to:

collect the time series of demand data from a set of data sources comprising a plurality of unique data types.

20. The computer program product of claim 18, wherein the instructions, when executed by the one or more computers, further cause the one or more computers to:

receive the input data stream via a bottom layer of the plurality of layers arranged in the hierarchy associated with the demand model;

generate, via the bottom layer, patterns based on the input data stream; and provide the patterns as inputs to a parent layer of the plurality of layers.

21. The computer program product of claim 18, wherein the instructions, when executed by the one or more computers, further cause the one or more computers to:

store a respective model of the respectively distinct sequence of temporal patterns.

\* \* \* \* \*